(No Model.)
G. F. HALL.
WINDOW DRESSER.
No. 388,776. Patented Aug. 28, 1888.
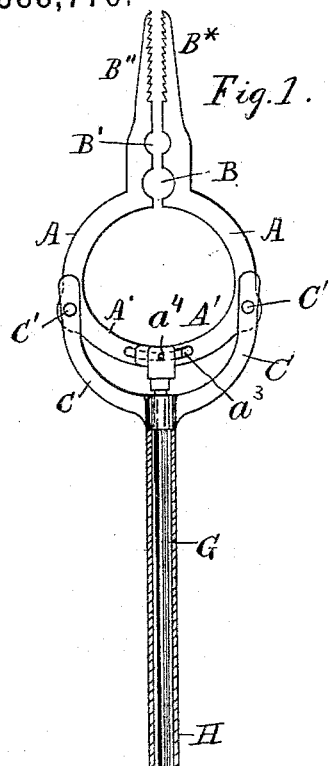
Fig. 1.
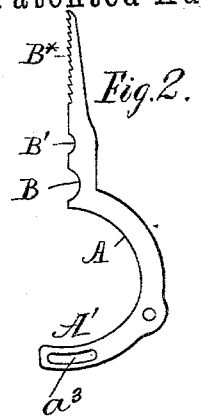
Fig. 2.
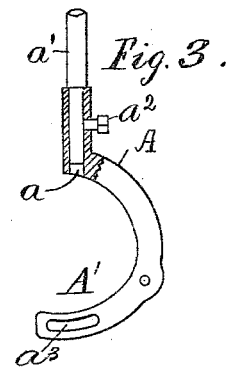
Fig. 3.
Fig. 4.
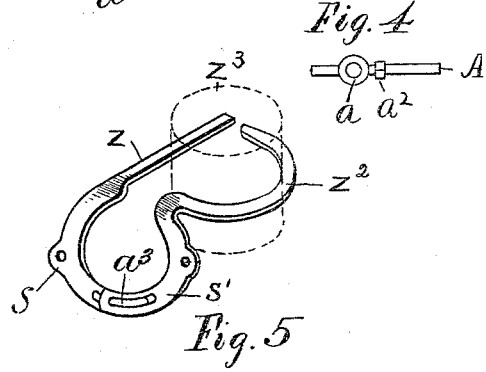
Fig. 5.
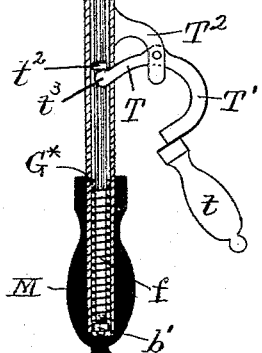
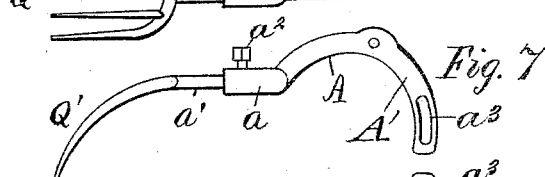
Fig. 6.
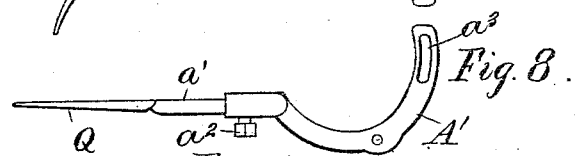
Fig. 7.
Fig. 8.
Fig. 9.
WITNESSES:
L. Lee.
F. C. Fischer.
INVENTOR.
George F. Hall, per
Crane & Miller, Attys.

UNITED STATES PATENT OFFICE.

GEORGE F. HALL, OF NEWARK, NEW JERSEY.

WINDOW-DRESSER.

SPECIFICATION forming part of Letters Patent No. 388,776, dated August 28, 1888.

Application filed April 21, 1888. Serial No. 271,434. (No model.)

*To all whom it may concern:*

Be it known that I, GEORGE F. HALL, a citizen of the United States, residing at Newark, Essex county, New Jersey, have invented certain new and useful Improvements in Window-Dressers, fully described and represented in the following specification and the accompanying drawings, forming a part of the same.

The object of this invention is to furnish an implement that will automatically retain its grip upon any article, and may therefore be used in securely handling the large variety of articles that are placed on exhibition in show-windows. To effect this object, I combine a pair of jaws with a long shank adapted to hold them at the desired distance from the operator, and apply a rod to operate the jaws from the base of the shank. A spring is preferably applied to the rod to hold it in its normal position. The form and arrangement of the jaws may be materially modified to suit different requirements, so that they may grasp and securely hold certain kinds of articles. The butt of the jaws may also be provided with a socket, into which the stem of a removable jaw or holder may be clamped, and the same implement thus be adapted for a variety of uses.

In the drawings, Figure 1 is a side view of the window-dresser. Fig. 2 shows one of the jaws detached from the same. Fig. 3 shows the butt of a jaw provided with a socket in section where hatched and the shank of a detachable jaw or holder therein. Fig. 4 is a plan of the parts shown in Fig. 3. Fig. 5 is a perspective view of a pair of jaws having their outer ends bent at right angles to their butt-ends, one of such arms being curved to grasp rounded objects, such figure showing a can (in dotted lines) inserted within the jaws. Fig. 6 is a plan and Fig. 7 a side view of the butt of a jaw provided with a removable jaw shaped as a curved fork, and Figs. 8 and 9 are similar views with the jaw shaped as a shovel.

H is the shank of the implement, of tubular form; M, a hand-piece at the base of the same; and C are arms extended from the opposite side of the shank at its forward end.

A represents the butts of the jaws, by which they are pivoted to the arms C, and $B''$ and $B^*$ are the operative ends of the jaws, while B and $B'$ represent recesses formed upon the inner sides of the jaws to fit articles of some specific form. The butts of the jaws are curved inwardly beyond the pivots $C'$, to form the lever-arms $A'$, shown lapped upon one another and provided at their ends with slots $a^3$.

A rod, G, is inserted in the shank H and provided at its forward end with a pin, $a^4$, fitted within the slots $a^3$ and operating, when the rod is pressed toward the hand-piece M, to move the jaws toward one another and hold them normally closed. The spring is inserted within the hand-piece M, its forward end pressing against a collar, $G^*$, fixed to the shank, and its rear end against a collar, $b'$, fixed upon the rod. The spring $f$ operates expansively to push the collars apart, and thus press the rod toward the hand-piece to hold the jaws normally closed. The rod is shown herein operated by means of a bell-crank pivoted by a bracket, $T^2$, upon the shank, and having an arm, T, operating upon the rod, and an arm, $T'$, provided with a handle, $t$. The arm T would be provided with a forked end, $t^3$, operating beneath the shoulder $t^2$ upon the rod G, so that the pressing of the handle $t$ toward the hand-piece M would compress the spring $f$ and push the rod forward to open the jaws, the latter being shown moved a little way apart in Fig. 1 by such action.

Fig. 5 shows a construction having one of the jaws bent to form a rounded socket, by which a round can, as indicated by dotted lines $z^3$, may be lifted from a shelf at right angles to the position of the operator. In this construction the outer ends, $z$ and $z^2$, of both the jaws are bent at right angles to their butts $s$ and $s'$, respectively.

Fig. 3 shows a construction for the jaw slightly different from that shown in Fig. 2, in that it has a socket, $a$, formed upon the butt provided with a set-screw, $a^2$, for securing in the socket a stem, $a'$, upon the forward end of which may be formed a jaw or holder of any suitable shape.

In Figs. 6 to 9, inclusive, are shown a fork, $Q'$, and shovel Q, adapted to operate in opposition to one another, as represented in Figs. 7 and 8, the jaws being intended to operate as described in connection with Fig. 1, and being adapted to lift a pan of candy or other shallow article having a flat bottom by inserting the shovel under such object and permitting the tines of the fork to rest upon the contents of the pan. The fork and shovel are shown formed with stems $a'$, adapted for convenient insertion in the socket $a$, and when such jaws are removed from the socket others of different character may be readily applied to adapt the implement to a variety of uses.

I have termed my invention a "window-dresser," because it is particularly applicable to dressing show-windows by the arrangement of all kinds of light articles in suitable locations in a window from some adjacent point inside the store. By forming the shank of suitable length the operator may be enabled to reach every part of the window and to insert therein and to remove at pleasure any article which would be wholly beyond the reach of his arm. The use of such an implement also enables an operator to change the trimming or arrangement of goods in the front part of a window when such space would be wholly inaccessible to an operator without such implement, except the articles in the rear of the window were first removed.

My implement may be extended to many points in the front of a large window through a small opening formed among the goods at the rear of the window, and the goods at such front points may therefore be changed or rearranged by the use of my implement without the entrance of the operator within the window or the removal of the goods at the rear to make room for the operator.

The device is also adapted to reach all the highest points of a window without the aid of a bench or step-ladder, and to remove numerous articles from lofty shelves, ceilings, and other points which are ordinarily reached only by the use of a ladder.

By bending the jaws or their butts, as shown in Fig. 5, or forming recesses in the same, as in Fig. 1, the jaws may be adapted to embrace round articles, as cans of various sizes and the stems of the stands often used for displaying bonnets, shoes, and other articles. In my invention the spring, when used, is preferably arranged to close the jaws normally, so that the article may be grasped without attention on the part of the operator; but it is obvious that the construction for the jaws and their lever-arms, as shown in Fig. 1, is adapted to be actuated in the opposite manner; and my claim to the particular construction for such jaws and the arms upon which they are pivoted is therefore independent of the use of the spring or its arrangement when used.

The projection of the arms C laterally from the shank H and the projection of the lever-arms $A'$ inwardly from the arms C produce a smooth rounded form for the bases of the jaws, thus adapting the device for easy insertion among crowded articles in a show-window. In like manner the tubular form of the shank H and the arrangement of the rod G within it incloses all the moving parts and prevents their entanglement with light articles, as feathers, lace, &c., in a show-window.

Having thus set forth my invention, what I claim herein is—

1. In a window-dresser, the combination, with the shank, of the arms extended from the opposite sides of the shank, the jaws pivoted separately thereto and extended inward toward one another, such jaws being provided with lever-arms extended inwardly therefrom and having slotted ends lapped upon one another, and a rod connected at one end to such slotted ends and extended to the base of the shank, substantially as herein set forth.

2. In a window-dresser, the combination, with a shank and a pair of jaws carried thereby, of sockets in the jaws for carrying removable holders and a rod arranged and adapted to be operated to actuate the jaws from the base of the shank, substantially as set forth.

3. In a window-dresser, the combination, with the tubular shank H, of the arms C, extended from the opposite sides of the shank, the jaws A, pivoted to such arms and extended inwardly to contact with one another, the butts of such jaws being provided with lever-arms $A'$, extended inward therefrom, a rod, G, inserted within the tubular shank and connected with both of such lever-arms, a spring, $f$, within the base of the tubular shank operating to hold the jaws in their operative position, and the lever-handle $T'$, carried upon the shank near its base and acting in opposition to the spring, substantially as herein described.

In testimony whereof I have hereunto set my hand in the presence of two subscribing witnesses.

GEORGE F. HALL.

Witnesses:
THOS. S. CRANE,
L. LEE.